(12) United States Patent
Roebroeks et al.

(10) Patent No.: US 7,955,713 B2
(45) Date of Patent: Jun. 7, 2011

(54) LAMINATE OF METAL SHEETS AND POLYMER

(75) Inventors: Geerardus Hubertus Joannes Jozeph Roebroeks, Den Bommel (NL); Jan Willem Gunnink, Nieuwerkerk A/d Ijssel (NL)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 12/303,790

(22) PCT Filed: Jun. 5, 2007

(86) PCT No.: PCT/NL2007/050265
§ 371 (c)(1),
(2), (4) Date: Jun. 29, 2010

(87) PCT Pub. No.: WO2007/145512
PCT Pub. Date: Dec. 21, 2007

(65) Prior Publication Data
US 2010/0266867 A1    Oct. 21, 2010

(30) Foreign Application Priority Data
Jun. 13, 2006 (NL) .................................... 2000100

(51) Int. Cl.
*B32B 7/00* (2006.01)
(52) U.S. Cl. .................. 428/608; 428/301.1; 428/301.4; 428/300.7
(58) Field of Classification Search .................. 428/213, 428/110, 608, 293.7, 297.7, 299.1, 299.4, 428/297.4, 301.1, 301.4
See application file for complete search history.

(56) References Cited

U.S. PATENT DOCUMENTS

| | | |
|---|---|---|
| 2,466,735 A | 4/1949 | Piazze |
| 3,580,795 A | 5/1971 | Eichenlaub |
| 4,402,778 A | 9/1983 | Goldsworthy |
| 4,489,123 A | 12/1984 | Schijve et al. |
| 4,500,589 A | 2/1985 | Schijve et al. |
| 4,502,092 A | 2/1985 | Bannink, Jr. et al. |
| 4,543,140 A | 9/1985 | Price |
| 4,670,080 A | 6/1987 | Schwartz et al. |
| 4,673,606 A | 6/1987 | Unden et al. |
| 4,752,526 A | 6/1988 | Daimon et al. |
| 4,792,374 A | 12/1988 | Rianda |

(Continued)

FOREIGN PATENT DOCUMENTS

DE    732923 C    3/1943

(Continued)

OTHER PUBLICATIONS

Li, X. et al., "Influence of fiber volume fraction on mode III interlaminar fracture toughness of glass/epoxy composites", Composites Science and Technology 64 (Dec. 16, 2003) pp. 1279-1286.

(Continued)

*Primary Examiner* — N. Edwards
(74) *Attorney, Agent, or Firm* — Greenberg Traurig, LLP

(57) ABSTRACT

The invention relates to a laminate of metal sheets and fiber-reinforced polymer layers connected thereto. The laminate comprises at least one thick metal sheet with a thickness of at least 1 mm that is connected to the rest of the laminate by means of at least one fiber-reinforced polymer layer, the fiber volume content of which is at most 45 volume-%. The invention also relates to a method for producing the laminate as well as skin sheets reinforced with the laminate for an aircraft or spacecraft.

9 Claims, 4 Drawing Sheets

U.S. PATENT DOCUMENTS

Figure 1:
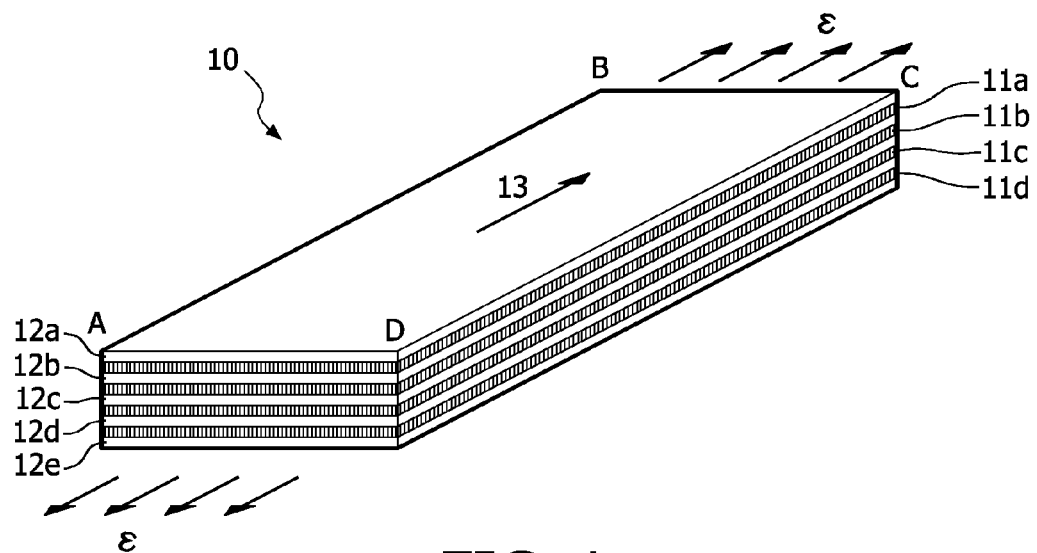

| | | | |
|---|---|---|---|
| 4,935,291 | A | 6/1990 | Gunnink |
| 4,992,323 | A | 2/1991 | Vogelesang et al. |
| 5,039,571 | A | 8/1991 | Vogelesang et al. |
| 5,094,790 | A | 3/1992 | Halter |
| 5,160,771 | A | 11/1992 | Lambing et al. |
| 5,429,326 | A | 7/1995 | Garesche et al. |
| 5,547,735 | A | 8/1996 | Roebroeks et al. |
| 5,814,175 | A | 9/1998 | Rau et al. |
| 5,866,272 | A | 2/1999 | Westre et al. |
| 6,114,050 | A | 9/2000 | Westre et al. |
| 7,074,479 | B2 | 7/2006 | Rogowski et al. |
| 7,192,501 | B2 | 3/2007 | Westre et al. |
| 7,223,318 | B2 | 5/2007 | Rajabali |
| 7,285,326 | B2 | 10/2007 | Schmidt et al. |
| 2003/0175520 | A1 | 9/2003 | Grutta et al. |
| 2005/0003145 | A1 | 1/2005 | Toi et al. |
| 2005/0175813 | A1 | 8/2005 | Wingert et al. |
| 2006/0060705 | A1 | 3/2006 | Stulc et al. |
| 2008/0277049 | A1 | 11/2008 | Roebroeks et al. |
| 2009/0151852 | A1 | 6/2009 | Roebroeks et al. |
| 2009/0211697 | A1 | 8/2009 | Heinimann et al. |
| 2010/0043939 | A1 | 2/2010 | Heinimann et al. |
| 2010/0133380 | A1 | 6/2010 | Roebroeks et al. |

FOREIGN PATENT DOCUMENTS

| | | | |
|---|---|---|---|
| DE | 4118814 A1 | 12/1991 | |
| DE | 4237834 A1 | 5/1994 | |
| EP | 0312150 A1 | 4/1989 | |
| EP | 0312151 A1 | 4/1989 | |
| EP | 0323660 A1 | 7/1989 | |
| EP | 1415799 A | 5/2004 | |
| EP | 1504888 A | 2/2005 | |
| FR | 2080567 A | 11/1971 | |
| GB | 2237239 | 5/1991 | |
| JP | 59050123 A | 3/1984 | |
| JP | 59079730 | 5/1984 | |
| WO | WO 80/02254 | 10/1980 | |
| WO | WO 98/53989 | 12/1998 | |
| WO | WO 03/068494 | 8/2003 | |
| WO | WO 2007/027093 | 3/2007 | |
| WO | WO 2007/035100 | 3/2007 | |
| WO | WO 2007/037695 | 4/2007 | |
| WO | WO 2007/061304 | 5/2007 | |
| WO | WO 2007/145512 | 12/2007 | |
| WO | WO 2008/033017 | 3/2008 | |

OTHER PUBLICATIONS

Hojo, Masaki et al., "Modes I and II interlaminar fracture toughness and fatigue delamination of CF/epoxy laminates with self-same epoxy interleaf", International Journal of Fatigue 28 (Mar. 20, 2006) pp. 1154-1165.

De Vries, T.J. et al., "The Influence of the Constituent Properties on the Residual Strength of Glare", Applied Composite Materials 8, pp. 263-277 (2001).

Vlot, A.D. et al., "Fibre Metal Laminates: An Introduction", Kulver Academic Publishers (2001), pp. 23-24, 81-84.

Heinimann, Markus et al., "Validation of Advanced Metallic Hybrid Concept with Improved Damage Tolerance Capabilities for Next Generation Lower Wing and Fuselage Applications", 24th ICAF Symposium—Naples, May 16-18, 2007.

Klapprott et al., "Improved Fatigue Life Through High Modulus-Fiber Reinforcement of Adhesives", 20th National Sample Symposium and Exhibition, vol. 20.—Society for the Advancement of Material and Process Engineering, Apr. 29-May 1, 1975.

International Search Report based on PCT/NL2006/050213 dated Jan. 31, 2007.

International Search Report based on PCT/NL2006/050236 dated Feb. 1, 2007.

International Search Report based on PCT/NL2006/050294 dated Feb. 1, 2007.

International Search Report based on PCT/NL2006/050235 dated Mar. 14, 2007.

International Search Report based on PCT/NL2007/050265 dated Aug. 30, 2007.

International Search Report based on PCT/NL2007/050418 dated Dec. 17, 2007.

International Search Report based on PCT/US2007/068986 dated May 22, 2008.

Office Action in U.S. Appl. No. 11/749,027 mailed on Oct. 15, 2009 from the USPTO.

Office Action in U.S. Appl. No. 12/088,189 mailed on May 25, 2010 from the USPTO.

English Translation of Opposition to corresponding European Patent No. 2 026 962 B1, filed with the European Patent Office on Nov. 22, 2010—Translation Provided by Continental Translation Service, Inc.

LAMINATE OF METAL SHEETS AND POLYMER

This application is a national phase filing under 35 U.S.C. 371 of International Application No. PCT/NL2007/050265, filed on Jun. 5, 2007, which claims the benefit of Netherlands Patent Application 2000100, filed Jun. 13, 2006, the entirety of which is hereby incorporated herein by reference for the teachings therein.

The invention relates to a laminate of metal sheets and fiber-reinforced polymer layers connected thereto. The invention also comprises the application of such a laminate as a reinforcing sheet for components of an aircraft or spacecraft.

Moldings made of a laminate comprising at least one metal sheet and one fiber-reinforced polymer layer connected thereto (hereinafter referred to as a metal laminate, fiber metal laminate or laminate for short) are increasingly used in industries such as the transportation industry, for example in cars, trains, aircraft and spacecraft. Such laminates can for example be used in the wings, fuselage and tail panels and/or other skin panels for aircraft, and generally ensure an improved fatigue resistance of the aircraft component.

The known fiber metal laminates were developed in the period between 1978 and 1990, and were sold on the market under brand names Arall® and Glare®. The known fiber metal laminate is constructed of a large number of relatively thin (typically 0.2 mm to 0.4 mm thick) aluminum sheets with polymer adhesive layers reinforced with aramid fibers (Arall®) or high strength glass fibers (Glare®) in-between. This means that the fiber volume content in the adhesive layers is relatively high with typical values of approximately 50 volume-% for Arall® and 60 volume-% for Glare®. Fiber metal laminates generally demonstrate good resistance to crack growth. A fatigue crack that has appeared in a metal sheet when subjected to alternating load will therefore not continue to grow quickly but will decelerate in crack growth. According to current knowledge, this is caused by the fiber-reinforced polymer layers—in particular the fibers thereof—spanning the crack and at least partially absorbing the forces responsible for crack growth.

Although the known fiber laminate demonstrates good fatigue properties for fuselage and wing skins, for example in an aircraft, it turns out that the production costs are relatively high. This is due to a number of factors. Typical moldings, in particular aircraft wing skins, can have a total thickness amounting to several centimeters. This means that tens of—or even a hundred—different layers are generally needed to construct a molding out of a fiber laminate. Furthermore, the thin metal sheets applied in the fiber laminate have to be rolled out to an extreme extent, to achieve the low thickness required for good fatigue properties. The metal sheets and fiber-reinforced polymer layers also have to meet close tolerances with respect to their composition and thickness. In addition, in the known fiber laminate, all metal sheets have to be treated so that they bond effectively to the fiber-reinforced polymer layers. Each metal sheet therefore has to be anodized and primed for example. Finally, to produce a molding out of the known fiber laminate, all layers are positioned on a mold. The more layers the structure requires, the more time-consuming and therefore costly it is to produce the molding.

A large number of the above problems could be resolved by applying thicker metal sheets in the known fiber metal laminate. However, if cracks appear in these metal sheets, a greater load will inevitably be transferred to the fiber-reinforced polymer layers spanning the cracks. Although the known fiber-reinforced polymer layers perform their crack-spanning function effectively in the known fiber laminate, they cause areas of delamination that are too considerable between the cracked metal sheet and adjacent fiber-reinforced polymer layer if the metal sheets are significantly thicker.

The object of the invention is to provide a laminate of the type referred to in the preamble, that can be used to meet the high requirements set by the aviation and space industry more effectively, and that can also be produced cost-effectively. The laminate according to the invention is thereto characterized as referred to in claim 1. It has surprisingly been found that resistance to delamination significantly increases if the laminate comprises at least one thick metal sheet with a thickness of at least 1 mm, and if this thick metal sheet connects to the rest of the laminate by means of at least one fiber-reinforced polymer layer, the fiber volume content of which is at most 45 volume-%. The laminate is thereby rendered more than sufficiently resistant to fatigue and can moreover be produced more simply and cheaply than the known laminate. By means of the measures described in the main claim, it is possible to use thicker metal sheets in the fiber metal laminates than has been the case to date. By applying thicker metal sheets in the laminate according to the invention, there is a greater chance of imperfections in the fiber impregnation. This is due to the high bending stiffness of such sheets, causing these sheets to create a pressure drop in the fiber-reinforced polymer layers of the laminate when the laminate is cured in an autoclave for example, which in turn impedes impregnation of the fibers contained therein. A further advantage of applying at least one fiber-reinforced polymer layer having a reduced fiber volume content is that there is less risk of insufficiently impregnated fibers in the fiber-reinforced polymer layers. Despite the fact that the laminate according to the invention comprises one or more fiber-reinforced polymer layers having a reduced fiber volume content, the laminate possesses good mechanical properties.

In an embodiment, a laminate according to the invention is characterized in that the fiber volume content of the specified fiber-reinforced polymer layer is at most 39 volume-%, at most 34 volume-%, at most 30 volume-%. Such fiber volume contents are lower than the contents usually applied in fiber-reinforced polymers. When reference is made in this application to a fiber-reinforced polymer layer having a reduced fiber volume content, it is understood to be a layer having a fiber volume content of at most 45 volume-%, at most 39 volume-%, at most 34 volume-%, at most 30 volume-%. The fiber-reinforced polymer layer having a reduced fiber volume content can for example be achieved by using a semi-finished product in which the fibers in the specified volume content are impregnated with a suitable polymer in a partially cured state (referred to as prepregs). It is also possible to combine a prepreg having a usual fiber volume content of 60 volume-% for example, with one or more polymer adhesive layers, in order to achieve an average reduced fiber volume content. In such a case, an adhesive layer is applied that is provided with a carrier, for example in the form of a network of polymer fibers, for example polyamid fibers. The carrier ensures that the adhesive layer retains a specific, pre-set thickness even after adhesion and curing. This is also advantageous for resistance to delamination. It is also possible according to the invention to combine dry —i.e. non-impregnated —fibers with a polymer adhesive layer in the appropriate volume ratios.

In a further embodiment, a laminate according to the invention includes at least one thick metal sheet having a thickness of at least 1.5 mm. It turns out that particularly good fatigue behavior is achieved if the thickness of the thick metal sheet is between 1.5 and 2.5 mm inclusive. According to the invention, it is also possible to apply more than one thick metal sheet. For instance, more than one metal sheet with a thickness of at least 1 mm can be interconnected in the fiber laminate according to the invention, creating a composite (thicker) metal sheet. In an embodiment, a laminate according to the invention, comprises at least two thick metal sheets that are interconnected by means of a fiber-reinforced polymer layer having a reduced fiber volume content.

The rest of the laminate can in principle be constructed out of any material known to the person skilled in the art. It is thus possible for the rest of the laminate to comprise a metal sheet or more than one metal sheet adhesively bonded to each other via adhesive layers that are possibly reinforced with fibers. In this respect, it is possible to opt for a wide thickness range of the metal sheets in the rest of the laminate. The rest of the laminate can also comprise a fiber-reinforced polymer. In an embodiment, the rest of the laminate comprises metal sheets and fiber-reinforced polymer layers connected thereto, the fiber volume content of which is at least 50 volume-%. With this embodiment, the rest of the laminate substantially corresponds to the laminate already known in the prior art. Applying such a laminate further enhances the mechanical properties, in particular the fatigue resistance.

Yet another embodiment of a laminate according to the invention is characterized in that, when the laminate is in unloaded state, a compressive stress on average prevails in the metal sheets of the rest of the laminate, and a tensile stress on average in the fiber-reinforced polymer layers. It should be noted that the presence of a tensile stress in the fiber-reinforced polymer layers does not mean that these layers only demonstrate tensile stresses. Rather a tensile stress prevails on average in a specific direction. The fiber-reinforced polymer layers can be subjected to tensile stress by drawing the laminate in a specific direction, whereby the metal sheets are deformed plastically. The average tensile stress prevailing in this direction in the polymer layers gives rise to an average compressive stress in the same direction in the metal sheets of the laminate. Fatigue behavior is further improved, by pre-stressing the rest of the laminate and then adhering it to at least one thick metal sheet by means of a fiber-reinforced polymer layer having a reduced fiber volume content.

It is advantageous to characterize the laminate according to the invention in that the metal sheets and/or the fiber-reinforced polymer layers in the rest of the laminate comprise a material that is different to the thick metal sheets and/or fiber-reinforced polymer layers having a reduced fiber volume content. In this way it is possible to set the properties of the metal layers and/or fiber-reinforced polymer layers in such a way that they are optimal for the function required in the laminate of the layer in question. It therefore turns out that for example fatigue resistance is further improved if the laminate according to the invention is characterized in that the metal sheets in the rest of the laminate have a higher yield stress than the thick metal sheets. It also turns out to be advantageous if the fiber-reinforced polymer layer in the rest of the laminate positioned closest to a thick metal sheet has a reduced fiber volume content.

In another embodiment, a laminate according to the invention, the thickness of the metal sheets in the rest of the laminate is less than 0.8 mm, between 0.2 and 0.8 mm inclusive, between 0.3 and 0.6 mm. Although applying thinner metal sheets per se leads to higher costs and is therefore not naturally obvious, it turns out that applying them in the rest of the laminate leads to a significant improvement in the properties of the overall laminate. The laminate according to the invention is additionally advantageous in that thinner metal sheets only have to be applied in a part of the laminate to be sufficient to achieve these improved properties. The same advantages are achieved if the thickness of the fiber-reinforced polymer layers in the rest of the laminate is less than 0.8 mm, for example between 0.2 and 0.6 mm inclusive.

The fiber-reinforced polymers applied in the fiber metal laminate are light and strong and comprise reinforcing fibers embedded in a polymer. The polymer also acts as a bonding means between the various layers. Reinforcing fibers that are suitable for use in the fiber-reinforced polymer include for example glass fibers, carbon fibers and metal fibers, and if required can also include drawn thermoplastic polymer fibers, such as aramid fibers, PBO fibers (Zylon®), M5® fibers, and ultrahigh molecular weight polyethylene or polypropylene fibers, as well as natural fibers such as flax, wood and hemp fibers, and/or combinations of the above fibers. It is also possible to use commingled and/or intermingled rovings. Such rovings comprise a reinforcing fiber and a thermoplastic polymer in fiber form. Examples of suitable matrix materials for the reinforcing fibers are thermoplastic polymers such as polyamides, polyimides, polyethersulphones, polyetheretherketone, polyurethanes, polyethylene, polypropylene, polyphenylene sulphides (PPS), polyamide-imides, acrylonitrile butadiene styrene (ABS), styrene/maleic anhydride (SMA), polycarbonate, polyphenylene oxide blend (PPO), thermoplastic polyesters such as polyethylene terephthalate, polybutylene terephthalate, as well as mixtures and copolymers of one or more of the above polymers. The thermoplastic polymers further comprise an almost amorphous thermoplastic polymer having a glass transition temperature $T_g$ of greater than 140° C., for example greater than 160° C., such as polyarylate (PAR), polysulphone (PSO), polyethersulphone (PES), polyetherimide (PEI) or polyphenylene ether (PPE), and in particular poly-2,6 dimethyl phenylene ether. According to the invention, it is also possible to apply a semicrystalline or paracrystalline thermoplastic polymer having a crystalline melting point $T_m$ of greater than 170° C., for example greater than 270° C., such as polyphenylene sulphide (PPS), polyetherketones, in particular polyetheretherketone (PEEK), polyetherketone (PEK) and polyetherketoneketone (PEKK), "liquid crystal polymers" such as XYDAR by Dartco derived from monomers biphenol, terephthalic acid and hydrobenzoic acid. Suitable matrix materials also comprise thermosetting polymers such as epoxies, unsaturated polyester resins, melamine/formaldehyde resins, phenol/formaldehyde resins, polyurethanes, etcetera.

In the laminate according to the invention, the fiber-reinforced polymer of one or more layers can comprise substantially continuous fibers that mainly extend in one direction (so-called UD material). It is advantageous to use the fiber-reinforced polymer in the form of a pre-impregnated semi-finished product. Such a "prepreg" shows generally good mechanical properties after it has been cured, among other reasons because the fibers have already been wetted in advance by the matrix polymer. In an embodiment of the laminate according to the invention, at least a part of the fiber-reinforced polymer layers substantially comprises two groups of continuous fibers extending in parallel, each group making the same angle with an intermediary direction. Such a stack of prepregs is also referred to by the person skilled in the art as "angle-ply". In particular a laminate having fiber-reinforced polymer layers in the rest of the laminate that substantially comprise two groups of continuous fibers extending in parallel and forming the same angle with an intermediary direction, is advantageous —particularly so if the laminate is applied in skin panels for an aircraft wing for example.

The fiber metal laminate according to the invention may be obtained by connecting a number of metal sheets and intermediary fiber-reinforced polymer layers to each other by heating them under pressure and then cooling them. If desired, the fiber metal laminate obtained in this way can be pre-drawn to achieve a favorable state of stress. This laminate is then adhesively bonded to at least one thick metal sheet through the medium of at least one fiber-reinforced polymer layer having a reduced fiber volume content. According to the invention, the layers are connected in a known way by providing them with a suitable adhesive and then curing this adhesive at least partially at a suitable temperature. In this respect, the adhesive can be applied separately. It is however also possible for the matrix material of the fiber-reinforced polymer to act as an adhesive between the layers. Fiber metal laminates according to the invention possess good specific mechanical properties (properties per unit of density), in particular with respect to metals such as aluminum.

In an embodiment of a laminate according to the invention, a laminate according to the invention is obtained by adhering at least one first thick metal sheet to at least one second thick metal sheet through the medium of at least one fiber-reinforced polymer layer having a reduced fiber volume content. According to the prior art, it is not usual to adhere thick metal sheets to each other, for example in cases where one of the metal sheets to be interconnected is discontinued. With thick metal sheets displaying a discontinuation, a significant load will inevitably be transferred from the discontinuing metal sheet to the adjacent metal sheet. A discontinuing metal sheet with a relatively large thickness transfers a significant concentration of stress to the adjacent metal sheet over a relatively wide area. In a static load scenario, in which for example there is a requirement for high strength, this may lead to delaminations in the interface between the two metal sheets and/or plastic deformation, in turn leading to a loss of strength in the continuing metal sheet. If adhesively bonded discontinued metal sheets exceed a specific thickness, crack initiation may also easily occur in adjacent metal sheets, impacting on the strength of the overall structure. The above problem may also occur with metal sheets that continue over the entire dimensions of the structure, such as for example a wing, albeit to a lesser extent. The laminate according to the invention resolves the above problem at least partially. This is done in that by using the fiber-reinforced polymer according to the invention as an interface between two thick metal sheets, the concentration of stress in the adjacent metal sheet is reduced and a slow growth in delamination will also occur between the metal sheets, further decreasing the stress concentration in the adjacent layers. Advantageously, sudden steps in thickness in the adhesively bonded metal sheet construction are prevented, said thickness steps being caused by sudden discontinuation of one of the metal sheets along larger breadths. At the end of a metal sheet, the thickness of the layer in question is advantageously reduced to a relatively small thickness. This can easily be achieved for example by milling off the material.

Metals that are particularly appropriate to use include light metals, in particular aluminum alloys, such as aluminum copper and/or aluminum zinc alloys, or titanium alloys. The metal sheets composed of an aluminum alloy can be selected according to the invention from the following group of aluminum alloys, such as types AA(USA) No. 2024, AA(USA) No. 7075, AA(USA) No. 7085, AA(USA) No. 7475 and/or AA(USA) No. 6013. In other respects, the invention is not restricted to laminates using these metals, so that if desired other aluminum alloys and/or for example steel or another suitable structural metal can be used.

In an embodiment, a laminate according to the invention comprises metal sheets, at least a part of which comprises an aluminum-lithium alloy. Such alloys increase the shearing stiffness of the laminate and are used in particular in the thick metal sheets. Yet another embodiment comprises a laminate with metal sheets, at least a part of which comprises an aluminum-magnesium-scandium alloy. Such alloys further enhance resistance to corrosion, and are used in particular in the thick metal sheets.

Depending on the intended use and requirements set, the optimum number of metal sheets can easily be determined by the person skilled in the art. Because it is possible with the invention to use thick metal sheets in the laminate, the total number of metal sheets for a molding of usual thickness will generally not exceed thirty, although the invention is not restricted to laminates with a maximum number of metal sheets such as this. According to the invention, the number of metal sheets is between 2 and 20, for example between 2 and 10. Because thicker metal sheets can be used in the laminate according to the invention than known to date, the number of layers in a molding is significantly less than is known in the prior art, and it is simpler, quicker and therefore cheaper to produce this molding than a molding based on the known laminate.

In an embodiment of a laminate according to the invention, the laminate is constructed from outside to inside of at least one thick metal sheet, at least one fiber-reinforced polymer layer having a reduced fiber volume content and the rest of the laminate. The rest of the laminate comprises metal sheets and fiber-reinforced polymer layers connected thereto, the fiber volume content of which is at least 50 volume-%. In an embodiment, a laminate is provided that is constructed symmetrically from outside to inside. Such a symmetrical embodiment comprises at least two thick metal sheets on the outside, between which a central laminate is affixed in the form of a number of metal sheets and fiber-reinforced polymer layers connected thereto, the fiber volume content of which is at least 50 volume-%. The two thick metal sheets are connected to the central laminate by means of at least one fiber-reinforced polymer layer having a reduced fiber volume content. By structuring the laminate according to the invention symmetrically with respect to a plane through the center of the thickness of the laminate, the laminate is at least partially prevented from warping as a result of internal stresses. This embodiment of the inventive laminate is also advantageous in that a large part of the infrastructure currently used within the aircraft industry for adhering aircraft panels can also be used for this material, primarily unchanged. Furthermore, thickness patterns can simply be applied in such a material in the manner that is currently usual for massive aluminum skins, namely by milling the thick outermost metal (aluminum) layers. In addition, the fatigue properties of the present embodiment meet the requirements set by the aviation industry for "care-free" materials, while also reducing the number of fiber-reinforced layers and the number of metal sheets to be treated and manipulated. When reference is made in this application to a "care-free" material, it is understood to mean a material in which the fatigue cracks subjected to a fatigue load remain so small that the strength of the structure remains greater than the strength required for the application. However, in a material that is not sensitive to fatigue, the cracks remain so small that they will not be found using the usual techniques for inspecting aircraft structures. Although not restrictive for the invention, a crack will generally grow up to at most approximately 100 mm in a "care-free" material in the life of an aircraft (20,000 to 60,000 flights), on the basis of an (artificially made) initial crack. This maximum crack length can however vary and is inter alia related to the residual strength of the damaged structure.

The laminates according to the invention are particularly suitable for forming skin sheets for the fuselage and/or wing of an aircraft or spacecraft. The invention also comprises an aircraft or spacecraft, the fuselage and/or wing of which is wholly or partially constructed out of skin sheets of the laminates according to the invention. In an embodiment of the invention, a skin sheet for example for the wing of an aircraft is formed of a laminate that is structured from outside to inside, and symmetrically, of at least one thick metal sheet, then at least one fiber-reinforced polymer layer having a reduced fiber volume content, and the rest of the laminate comprising in this exemplary embodiment 5 to 10 metal sheets and 4 to 9 fiber-reinforced polymer layers connected thereto, the fiber volume content of which is at least 50 volume-%. It is however also possible for the rest of the laminate to comprise fewer layers, for example only two metal sheets with an intermediary fiber-reinforced polymer layer. It is furthermore possible for the rest of the laminate to comprise only one thick metal sheet. If desired, such a laminate can comprise thick metal sheets of different and if desired tapering thickness, for example to enable a thickness pattern to be milled herein. The wing of an aircraft according to the invention is provided with such skin sheets, such that the fibers of the fiber-reinforced polymer layers in the rest of the laminate substantially comprise two groups of continuous fibers extending in parallel, with each group making an angle with the intermediary direction that corresponds to the longitudinal direction of the wing. It is thus advantageous for example to allow at least some of these reinforcing fibers to extend in a direction forming an angle of approximately 45 degrees with the longitudinal direction of the wing. When reference is made in this application to the longitudinal direction of the wing, it is understood to be the direction from fuselage to wing tip. The longitudinal direction makes an angle with the bow direction that can vary depending on the position of the wings, said bow direction corresponding to the direction of air flow from the front edge to the rear edge of the wing. In fatigue-critical areas of the wing, such as the root of the wing, this can if desired be reinforced according to the invention with one or more known laminates (generally referred to as "doublers" in this case), such as Glare® for example, and/or with laminates according to the invention. An average reduction in stress is achieved by means of the local thickness structure.

A skin sheet according to the invention which is also particularly suitable is further locally reinforced by means of at least one longitudinal stiffener connected thereto via an adhesive layer, also referred to as a "stringer" by the person skilled in the art. The longitudinal stiffener can comprises a metal laminate possibly reinforced with fibers, such as a laminate according to the invention. In an embodiment, the longitudinal stiffener comprises a laminate according to the invention that substantially only comprises thick metal sheets formed out of a flat sheet material or obtained by extruding separate thin-walled profiles that are adhesively bonded to each other via fiber-reinforced polymer layers having a reduced fiber volume content. A suitable exemplary embodiment comprises for example thick aluminum sheets that are approximately 1.5 mm thick.

In a further embodiment of a skin sheet according to the invention, the longitudinal stiffener is connected to the skin sheet by means of an adhesive layer comprising a fiber-reinforced polymer. A skin sheet that is also particularly suitable is constructed out of a laminate comprising from outside to inside at least one thick metal sheet, at least one fiber-reinforced polymer layer having a reduced fiber volume content and the rest of the laminate, whereby the outermost thick metal sheet comprises a sheet integrally provided with stiffening ribs. Such a skin sheet will not generally be constructed symmetrically. The sheet provided with stiffening ribs can comprise an extruded aluminum sheet, referred to as an "extrusion" by the person skilled in the art. Such extrusions comprise a flat sheet part substantially provided with stiffening elements, said sheet part being obtained by extruding a tubular form and then cutting this open, straightening and milling it and if desired pretreating it for adhesion. According to the invention, a laminate is obtained that in particular demonstrates a high tolerance and that can be produced simply and at a low price.

Further features of the invention will emerge from the following schematic figures, without otherwise being restricted thereto.

Figure 2:
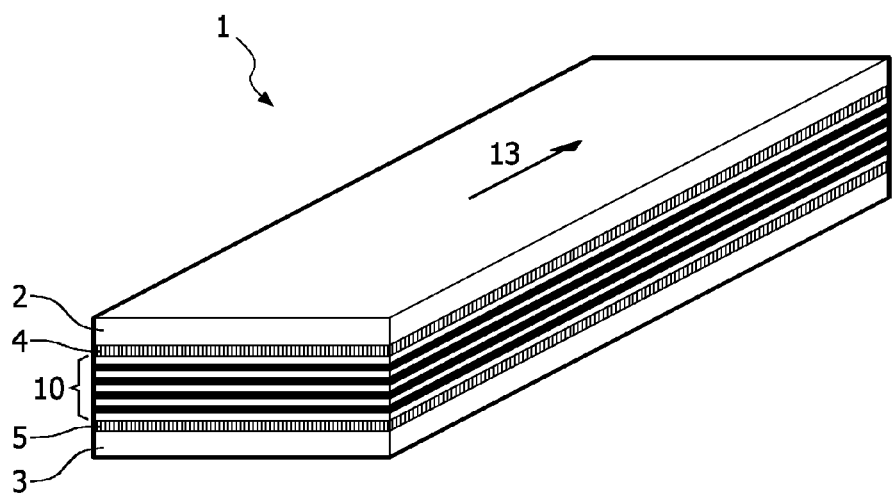
Figure 3:
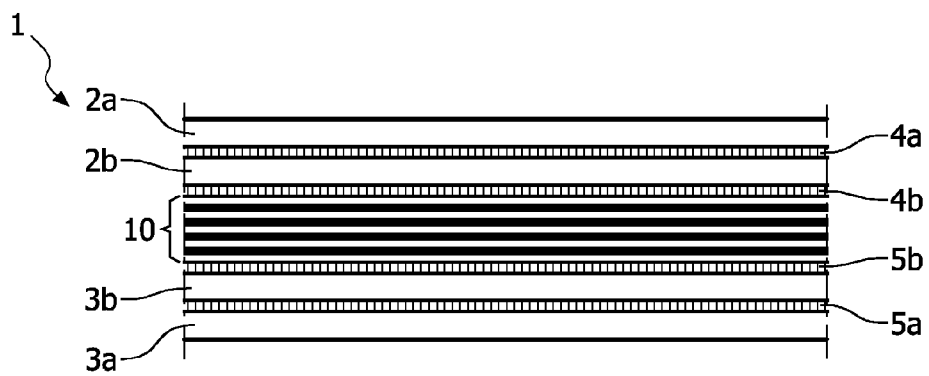
Figure 4:
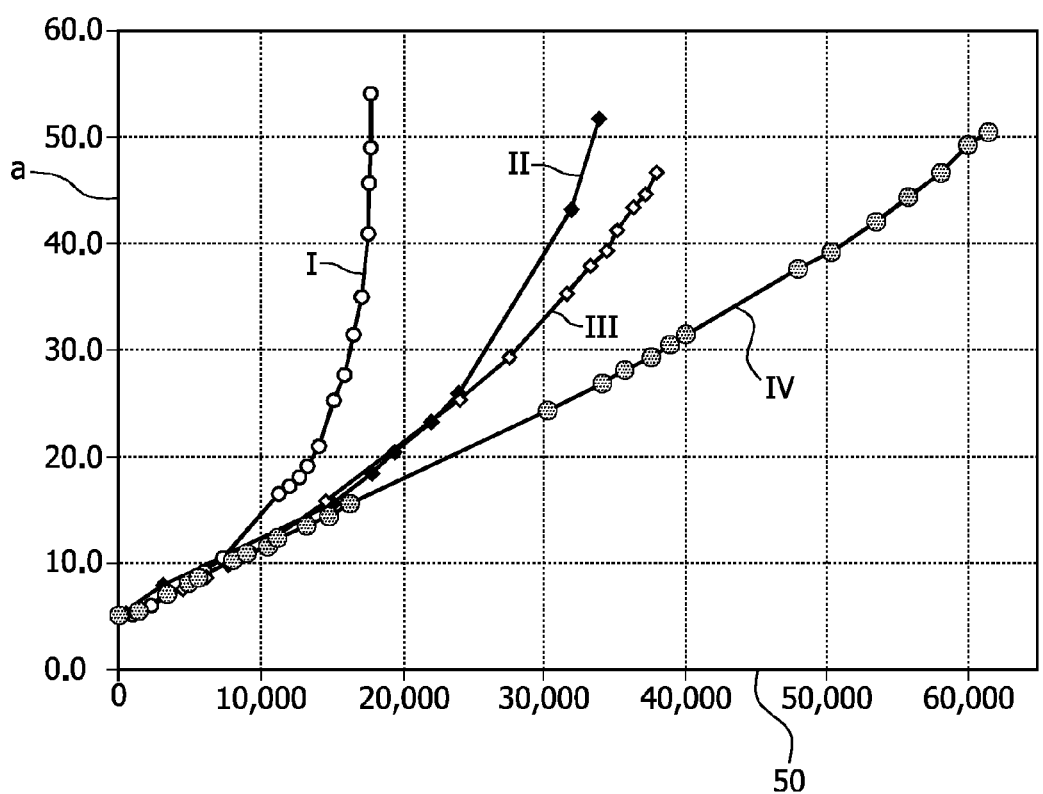

FIG. 1 shows a part of the laminate (referred to in the present application as the rest of the laminate) according to the invention with nine layers, FIG. 2 shows a laminate according to the invention incorporating the rest of the laminate according to FIG. 1, FIG. 3 shows a cross-section of another embodiment of the laminate according to the invention, FIG. 4 shows the development of crack growth when subjected to alternating load for a 4 mm thick aluminum 2024-T3 sheet and three embodiments of the laminate according to the invention, FIG. 5 shows the structure of a skin sheet for an aircraft wing using a laminate according to the invention, and FIG. 6 finally shows a number of structural embodiments of a skin sheet for an aircraft wing using a laminate according to the invention.

FIG. 2 shows a laminate 1 according to the invention with a total of 11 layers. It should be noted that the layer thicknesses shown in the figures do not necessarily correspond to the actual thickness ratios. Laminate 1 comprises two thick metal layers 2 and 3 made of a suitable aluminum alloy on both outer sides. The core of the laminate 1 is formed by a residual laminate 10, that is connected on either side to thick metal sheets 2 and 3 by means of one fiber-reinforced polymer layer (4, 5) on either side, having a reduced fiber volume content. Although not shown in FIG. 2, if desired it is possible to affix more than one thick metal sheet (2, 3) over each other, as shown in FIG. 3 for two pairs of thick metal sheets (2a, 2b) and (3a, 3b), in order to construct the required thickness. It is also possible to have the thick metal sheets (2, 3) extend in a crossed fashion to each other, whereby overlapping sheets are beveled at the side edges and are positioned so that they are at least partially overlapping along the beveling (a technique referred to as "splicing"). More than one thick metal sheet (2a, 2b) and (3a, 3b) are preferably interconnected by means of fiber-reinforced polymer layers (4a, 5a) having a reduced fiber volume content, as shown in FIG. 3. The connection between the thick metal sheets (2b, 3b) and the rest 10 of the laminate is formed by fiber-reinforced polymer layers (4b, 5b) having a reduced fiber volume content. It is possible for the layers (4a, 5a) and (4b, 5b) to be formed differently.

FIG. 1 shows an embodiment of the rest 10 of the laminate according to the invention in the form of a flat rectangular sheet. In the exemplary embodiment shown, the residual laminate 10 comprises the part of the laminate 1 not composed of the thick metal sheets (2, 3) and connecting layers (4, 5). Residual laminate 10 is constructed out of five metal sheets 12 having a thickness of for example 0.2 mm, comprising an aluminum alloy, for example 2024-T3. The metal sheets 12 are securely interconnected by means of four fiber-reinforced polymer layers 11 based on epoxy resin that is also a good metal adhesive. A fiber-reinforced connecting layer 11 comprises and is formed of glass fibers impregnated with the specified polymer, having a fiber volume content of approximately 60 vol.-%. These preimpregnated prepregs 11 with a thickness of approximately 0.25 mm are formed of (unidirectional) glass fibers extending parallel to each other in direction 13. The residual laminate 10 is produced by applying the specified layers 11 and 12 to each other in the sequence shown in FIG. 1, for example on a flat mold. After lamination, the overall structure is cured at a temperature suitable for the epoxy resin. For most applications, an epoxy resin with a high glass transition temperature will be most suitable. Such epoxy resins are generally cured at a temperature of approximately 175° C. Although not essential for the invention, it is advantageous, after the structure shown in FIG. 1 has been cured, to impose an elongation in the structure's longitudinal direction that is greater than the elastic elongation of the metal sheets 12 and less than the elongation at break of the fiber-reinforced polymer layers 11. Such a pre-stress of the residual laminate 10 can for example be achieved by imposing an elongation $\epsilon$ of between 0.1 and 2 percent on the residual laminate 10 in the longitudinal direction thereof. Depending on the fibers applied in the fiber-reinforced polymer layers, the range of this elongation can also lie elsewhere. The residual laminate 10 can be pre-stressed by feeding it through a rolling mill under pressure. In this way, a method is provided that can be applied on an industrial scale. By setting the exerted compressive force at a sufficiently high level, the deformations in the plane of the residual laminate 10 are of such a size that the imposed elongation $\epsilon$ in the longitudinal direction exceeds the plasticity limit of the metal of the metal sheets 12, causing the metal sheets 12 to permanently deform, without leading to a failure of the fiber-reinforced polymer layers 11. By drawing the residual laminate 10 in the longitudinal direction, a particularly favorable state of stress is created, with a compressive stress being present on average in each metal sheet 12 in an unloaded state, and a tensile stress being present on average in each fiber-reinforced polymer layer 11. It will thus be possible for the sublaminate and/or laminate thereby obtained to demonstrate for example an increased yield stress. This is also advantageous for the fatigue behavior. The increased yield stress is additionally advantageous if types of aluminum are also applied in the laminate that already intrinsically demonstrate an increased yield stress compared to the known aluminum alloys based on copper and zinc, such as the 2000 series for example.

Figure 5A:
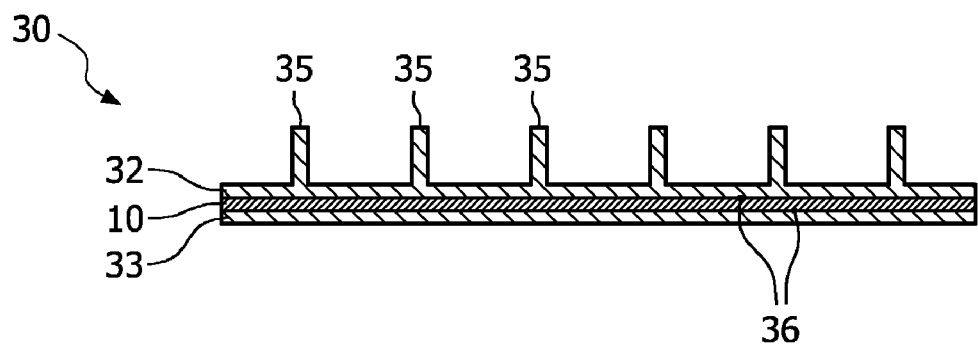
Figure 5B:
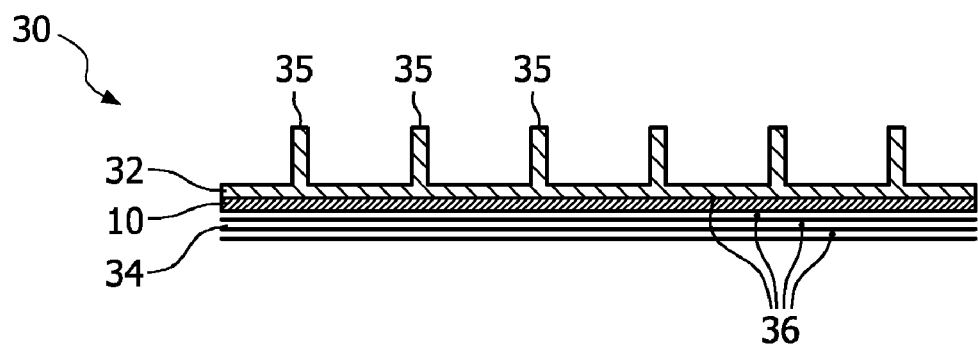
Figure 5C:
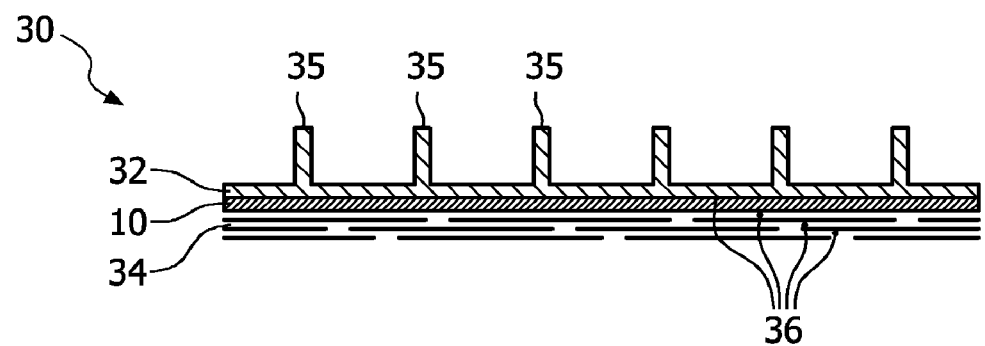
Figure 6A:
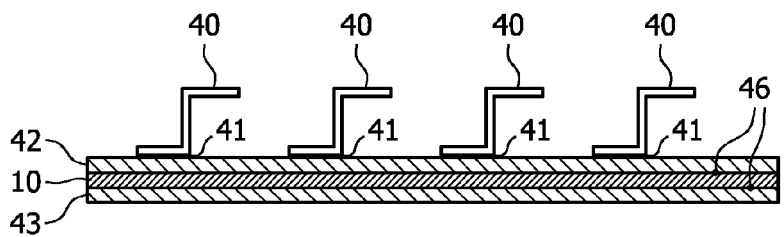
Figure 6B:
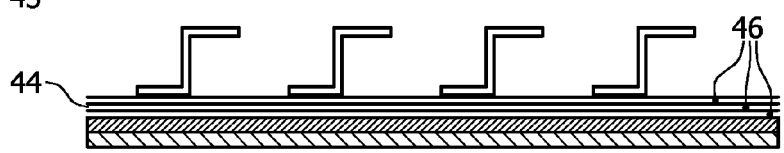
Figure 6C:
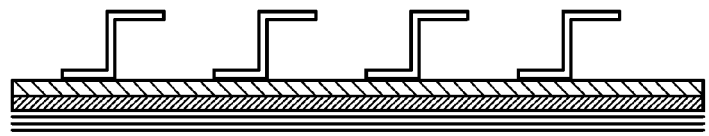
Figure 6D:
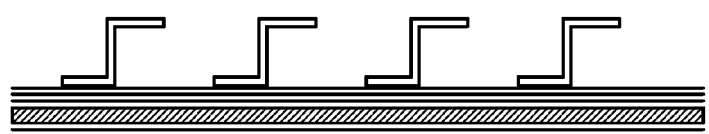
Figure 6E:
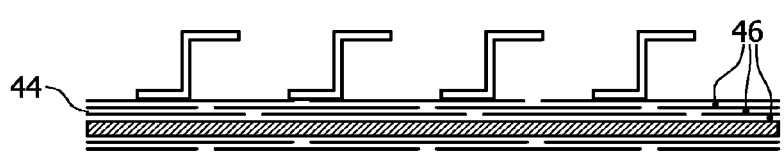
Figure 6F:
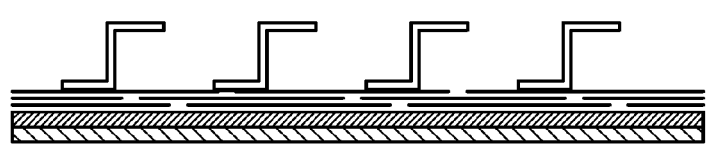
Figure 6G:
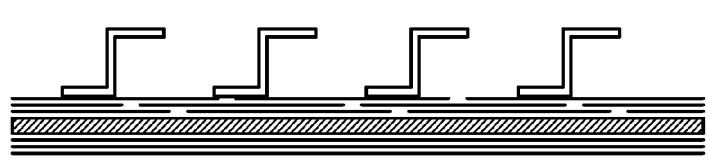
Figure 6H:
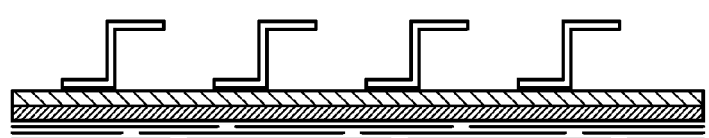
Figure 6I:
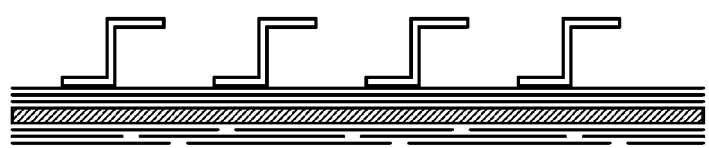

FIGS. 5(a), 5(b) and 5(c) show three embodiments of a skin sheet 30 for the wing of an aircraft. Skin sheet 30 is formed out of a laminate 1 according to the invention, comprising a centrally affixed residual laminate 10, constructed out of metal sheets that are securely interconnected by means of fiber-reinforced polymer layers based on epoxy resin, having a fiber volume content of at least 50 volume-%. The three skin sheets 30 shown comprise, on the upper side (according to the figure), a thick metal sheet in the form of a sheet 32 integrally provided with stiffening ribs 35, preferably an extruded aluminum-containing sheet. In the embodiment shown in FIG. 5(a), the under side is formed of a thick metal sheet 33. Both thick sheets 32 and 33 are connected to the centrally positioned residual laminate 10 by means of two fiber-reinforced polymer layers 36 having a reduced fiber volume content. In the embodiment shown in FIG. 5(b), the under side of the skin sheet 30 (which obviously corresponds to the side of the wing facing outward) is formed by a number of thick metal layers 34 that are connected to each other as well as to the central residual laminate 10 by means of fiber-reinforced polymer layers 36 having a reduced fiber volume content. In the embodiment shown in FIG. 5(c), the under side of the skin sheet 30 is formed by a number of thick metal layers 34 that are interrupted and connected in a crossed fashion with respect to each other (partially overlapping) by means of fiber-reinforced polymer layers 36 having a reduced fiber volume content. However it is also advantageous to position the edges of the thick metal sheets substantially against each other ("butted edges"), so that less stringent requirements have to be set with respect to positioning accuracy.

FIGS. 6(a) to 6(i) inclusive show nine embodiments of a skin sheet 30 for the wing of an aircraft. The reference figures are only indicated once in these figures. In these embodiments, skin sheet 30 is reinforced with a number of longitudinal stiffeners 40 connected thereto by means of an adhesive layer 41. Longitudinal stiffeners 40 can comprise aluminum profiles, but preferably comprise a laminate according to the invention, whereby the adhesive layer 41 preferably comprises a fiber-reinforced polymer. In such an exemplary embodiment of the longitudinal stiffener 40, said stiffener therefore comprises at least one thick metal sheet, preferably an aluminum sheet, and at least one fiber-reinforced polymer layer having a reduced fiber volume content, which is used to adhesively bond the thick metal sheet to the rest of the longitudinal stiffener 40. The rest of said stiffener can then be constructed of more than one thick metal sheet adhesively bonded to each other by means of a fiber-reinforced polymer layer having a low fiber volume content if desired; or a known laminate, for example Glare®; or a combination of thick metal sheets and a known laminate, for example Glare®. It is also possible to construct the longitudinal stiffener substantially out of thick metal sheets formed out of a flat sheet material or obtained by extruding separate thin-walled profiles that are adhesively bonded to each other via fiber-reinforced polymer layers having a reduced fiber volume content. The skin sheet 30 is further formed out of a laminate 1 according to the invention, comprising a centrally affixed residual laminate 10, constructed out of metal sheets that are securely interconnected by means of fiber-reinforced polymer layers based on epoxy resin, having a fiber volume content of at least 50 volume-%. The skin sheet 30 shown in FIG. 6(a) comprises a thick metal sheet (42, 43) on either side of the centrally affixed residual laminate 10. Both thick sheets (42, 43) are connected to the centrally positioned residual laminate 10 by means of two fiber-reinforced polymer layers 46 having a reduced fiber volume content. In the embodiments shown in FIGS. 6(b), 6(c) and 6(d), the under and/or upper side of the skin sheet 30 is formed by a number of thick metal layers 44 that are connected to each other as well as to the central residual laminate 10 by means of fiber-reinforced polymer layers 46 having a reduced fiber volume content. In the embodiments shown in FIGS. 6(e) to 6(i) inclusive, the under and/or upper side of the skin sheet 30 is formed by a number of thick metal layers 44 that are interrupted and connected in a crossed fashion with respect to each other (possibly partially overlapping) by means of fiber-reinforced polymer layers 46 having a reduced fiber volume content. Skin sheets of wings are generally of a thickness varying between 3 mm at the wing tip and a maximum of approximately 30 mm at the wing root. With the known laminate, such a thickness can only be achieved by making a structure of approximately 50 aluminum sheets and 49 layers of fiber-reinforced polymer, assuming a thickness of 3 mm in a 5/4 construction (5 layers of aluminum sheet and 4 layers of fiber-reinforced polymer in-between). It should be noted that stacking such numbers, in particular the metal sheets, constitutes an almost unworkable production process, with a view to manipulating the many thin sheets and pretreating them. The laminate according to the invention resolves this problem.

A number of laminates 1 according to the invention were subjected to a fatigue test under a load extending in the direction 13. In FIG. 4, the fatigue behavior of the laminates 1 according to the invention is shown and compared with the fatigue behavior of a 4 mm thick aluminum sheet of type 2024-T3. To this end, testpieces of 200×500 mm of the laminates were subjected to tensile stress with a sinusoidally extending average load of 100 MPa and a frequency of 10 Hz. The testpieces were beforehand provided with a sharp initial crack transverse to the direction of tension having a length of 2a=10 mm. In FIG. 4, the half crack length a expanded along the vertical axis. The total number of flights 50 of the simulated wing load expanded along the horizontal axis.

Line I corresponds to the crack growth of the 4 mm thick aluminum sheet of type 2024-T3.

Line II corresponds to the crack growth of a laminate comprising a central residual laminate made of Glare® fiber metal laminate adhesively bonded in a second autoclave cycle between two 4 mm thick aluminum 2024-T3 sheets, using FM 94 adhesive film (without fibers). The adhesive film was provided with a carrier that maintained the thickness of the adhesive layer during the autoclave cycle. The central residual laminate comprises a Glare® 1-5/4-0.4 laminate (based on five 0.4 mm thick aluminum layers) that was pre-drawn with an elongation of 0.5%. A standard S2 glass prepreg based on FM 94 adhesive was used in this Glare® fiber metal laminate. The fiber volume content of the prepreg was 60 volume-%.

Line III corresponds to the crack growth of a laminate 1 constructed in the same way as the line II laminate, provided that the central residual laminate was adhesively bonded on the outermost 4 mm thick aluminum 2024-T3 layers using the same S2 glass prepreg as applied in the central laminate.

Finally, line IV corresponds to a laminate according to the invention. This laminate is constructed in the same way as the laminate corresponding to line III, provided that a prepreg based on S2 glass fiber and FM 94 epoxy, combined with an FM 94 adhesive film, was applied in the second autoclave cycle to adhere between the 4 mm thick aluminum sheets and the central fiber metal laminate. Thus on balance, this adhesive layer showed a reduced fiber volume.

As can be seen in FIG. 4, the laminate 1 (line IV) according to the invention demonstrates clearly reduced crack growth when subjected to the specified load in comparison with the aluminum laminate (line I) or other laminates (lines II and III) according to the prior art.

Wherever reference is made in the description and claims to the modulus of elasticity, tensile strength and elongation at break of the fibers, they are understood to mean the values under tensile load in the longitudinal direction of the fiber and are determined via measurements on the completed laminate.

Within the scope of the invention, various changes can be incorporated. Although metal sheets of the same thickness are firstly applied in the laminates according to the invention, it is in principle also possible to apply metal sheets having two or more different thicknesses in one and the same laminate in a possibly symmetrical stack. In general, the thickness of the polymer layer between two consecutive metal sheets in the residual laminate will approximately be of the same size order as that of each of the metal sheets. If desired, the laminates can furthermore demonstrate a tapering thickness as well as a tapering depth.

The invention claimed is:

1. A structure comprising:
   a laminate including at least a first metal layer having a thickness of at most about 0.8 mm, at least a second metal layer having a thickness of at most about 0.8 mm, and a fiber-reinforced polymer layer having a fiber volume content of at least about 50% therebetween;
   at least one upper metal layer connected to a top of the laminate and having a constant thickness of at least about 1.0 mm; and
   at least one lower metal layer connected to a bottom of the laminate and having a constant thickness of at least about 1.0 mm,
   wherein the at least one upper metal layer connects to the laminate by a first fiber-reinforced polymer layer having a fiber volume content not exceeding about 45%, and wherein the at least one lower metal layer connects to the laminate by a second fiber-reinforced polymer layer having a fiber volume content not exceeding about 45%.

2. The structure of claim 1 wherein each of the first fiber-reinforced polymer layer having a fiber volume content not exceeding about 45% and the second fiber-reinforced polymer laying having a fiber volume content not exceeding about 45% includes reinforcing fibers embedded in a polymer matrix.

3. The structure of claim 2 wherein the reinforcing fibers are selected from the group consisting of glass fibers, carbon fibers, metal fibers, drawn thermoplastic fibers, natural fibers and combinations thereof.

4. The structure of claim 2 wherein the polymer matrix is a thermoplastic polymer matrix or a thermosetting polymer matrix.

5. The structure of claim 1 wherein the at least one upper metal layer and the at least one lower metal layer includes an aluminum alloy.

6. The structure of claim 1 wherein the laminate is a pre-stressed fiber metal laminate having an average compressive stress in both the at least first metal layer and the at least second metal layer and an average tensile stress in the fiber-reinforced polymer layer in an unloaded state.

7. The structure of claim 1 wherein the at least first metal layer and the at least second metal layer of the laminate has a higher yield stress than the at least one upper metal layer and the at least one lower metal layer.

8. The structure of claim 2 wherein the reinforcing fibers are impregnated with the polymer matrix in a partially cured state.

9. The structure of claim 1 for use as a skin sheet for an aircraft.

* * * * *